(12) United States Patent
Lacerte et al.

(10) Patent No.: US 9,369,484 B1
(45) Date of Patent: Jun. 14, 2016

(54) DYNAMIC SECURITY HARDENING OF SECURITY CRITICAL FUNCTIONS

(71) Applicants: Yves Lacerte, Eden Prairie, MN (US); Luke E. Ryon, Cedar Rapids, IA (US); Patrick J. Morrissey, Cedar Rapids, IA (US)

(72) Inventors: Yves Lacerte, Eden Prairie, MN (US); Luke E. Ryon, Cedar Rapids, IA (US); Patrick J. Morrissey, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 14/340,010

(22) Filed: Jul. 24, 2014

(51) Int. Cl.
*G06F 21/00* (2013.01)
*H04L 29/06* (2006.01)

(52) U.S. Cl.
CPC ........ *H04L 63/1441* (2013.01); *H04L 63/1416* (2013.01)

(58) Field of Classification Search
CPC .......................... G06F 21/00; H04L 63/1441
See application file for complete search history.

(56) References Cited

U.S. PATENT DOCUMENTS

| 7,581,002 B2 * | 8/2009 | Royalty | H04L 63/1408 244/121 |
| 2003/0065409 A1 * | 4/2003 | Raeth | G05B 9/02 700/31 |
| 2011/0219035 A1 * | 9/2011 | Korsunsky | G06F 21/00 707/784 |
| 2012/0232679 A1 * | 9/2012 | Abercrombie | G06Q 10/04 700/44 |
| 2013/0268994 A1 * | 10/2013 | Cooper | G06F 15/16 726/1 |
| 2013/0318615 A1 * | 11/2013 | Christodorescu | G06F 21/00 726/25 |
| 2013/0318616 A1 * | 11/2013 | Christodorescu | G06F 21/00 726/25 |

* cited by examiner

*Primary Examiner* — Morshed Mehedi
(74) *Attorney, Agent, or Firm* — Angel N. Gerdzhikov; Donna P. Suchy; Daniel M. Barbieri

(57) ABSTRACT

A method for providing dynamic security hardening of selected aircraft functions includes: a) monitoring sequences of real-time security events for at least one aircraft function; b) accessing a database storing a plurality of sequences of attack events indicative of an attack of the at least one aircraft function; c) probabilistically inferring, by at least one processor, the location and progression of an attack represented within the database by utilizing the sequences of real-time security events; and d) activating at least one countermeasure in response to an inferred location and progression of an attack.

18 Claims, 4 Drawing Sheets

DYNAMIC SECURITY HARDENING OF SECURITY CRITICAL FUNCTIONS

BACKGROUND

1. Field of the Inventive Concepts

The inventive concepts disclosed herein relate generally to computer network security and more particularly, but not by way of limitation, to methods and systems for providing dynamic security hardening of selected aircraft functions.

2. Description of the Related Art

Embedded avionic systems, due to their size, weight and power (SWAP) requirements, have limited computing resources. Operating security countermeasures at all times consumes valuable resources. Likewise, "always on" countermeasures, which may not be needed at all times, waste valuable computing resources. Furthermore, real-time security events are generally difficult to report to an aircraft operator, simply because operators are not usually trained to deal with security breaches, unless a security breach leads to safety issues. Aircraft operators are well trained to react to safety issues. To ease the burden of reporting security breaches, some level of automation is needed such that the aircraft can automatically assess and recover from security breaches, without involving the aircraft operators.

There has been a partial response to this problem. For example, U.S. Pat. Publication. Nos. 2013/0318615A1 and 2013/0318616A1, both issued to M. Christodorescu, et al. entitled, "PREDICTING ATTACKS BASED ON PROBABILISTIC GAME-THEORY," disclose systems and methods for determining cyber-attack targets. These include collecting and storing network event information from sensors to extract information regarding an attacker; forming an attack scenario tree that encodes network topology and vulnerability information including paths from known compromised nodes to a set of potential targets; calculating a likelihood for each of the paths using a processor; calculating a probability distribution for the set of potential targets to determine which potential targets are most likely pursued by the attacker; calculating a probability distribution over a set of nodes and node vulnerability types already accessed by the attacker; determining a network graph edge to remove, which minimizes a defender's expected uncertainty over the potential targets; and removing the determined network graph edge. In the Christodorescu, et al. '615 and '616 patents, a game-theoretic approach is used to identify the best countermeasure given attack/response sequences.

As another example, U.S. Pat. No. 7,581,002, issued to C. D. Royalty, et al. entitled, "METHODS AND SYSTEMS FOR NETWORK FAILURE REPORTING," discloses methods and systems for alerting airline personnel to potential aircraft data network security breaches. The airline personnel include at least one of flight crew personnel and maintenance crew personnel. The method includes detecting and categorizing potential aircraft data network security breaches, and recording the potential aircraft data network security breaches within an aircraft's existing crew alerting and maintenance data storage and reporting system. To summarize, the general focus of prior art systems is on large enterprise systems (e.g. as illustrated in the Christodorescu, et al. '615 and '616 patents). The Royalty et al. '002 patent does not automatically apply avionics specific countermeasures.

SUMMARY

In one aspect, embodiments of the present invention are directed to a method for providing dynamic security hardening of selected aircraft functions. The method may include the steps of: a) monitoring sequences of real-time security events for an aircraft function; b) accessing a database storing sequences of attack events indicative of an attack of the aircraft function; c) probabilistically inferring, by a processor, the location and progression of an attack represented within the database by utilizing the sequences of real-time security events; and d) activating a countermeasure in response to the inferred location and progression of the attack.

Thus, embodiments of the present invention provide the ability to reason about security events and attack sequences (documented in the form of attack trees). A by-product of the reasoning is the application of suitable countermeasures. In an avionics context, the number of possible countermeasures is relatively small and each countermeasure is relatively simple. The Christodorescu, et al. '615 and '616 patents provide a game-theoretic approach and assume a much larger set of possible countermeasures. The present invention automatically applies avionics specific countermeasures.

The present invention solves an important problem since many avionic company systems that provide security countermeasures are expensive to operate. The adaptable security mechanism of the present invention enhances avionic system product performance, while providing a level of security commensurate with the operating environment.

In an embodiment, the aircraft function is selected from a group of aircraft functions including: data loading, electronic flight bags, and passenger information and entertainment service domain.

In some embodiments, the step of probabilistically inferring may include querying the database by: a) inferring the current node(s) under attack in the appropriate attack tree for a real-time security event; b) inferring the next node(s) under attack in the appropriate attack tree for a sequence of real-time security events; and c) identifying whether a security property specified in a root node of said plurality of nodes is violated.

In some embodiments, the step of probabilistically inferring may include multicriteria decision making utilizing fuzzy set theory.

In another aspect, embodiments of the invention are directed to a system for providing dynamic security hardening of selected aircraft functions. The system includes sensors to collect and log data entering an aircraft. The system also includes a dynamic security hardening engine. The dynamic security hardening engine includes a monitor agent for receiving the data collected by the sensors, analyzing the data, and generating sequences of real-time security events for an aircraft function. An inference engine accesses a database storing sequences of attack events indicative of an attack of the aircraft function; and probabilistically infers, via a processor, the location and progression of an attack represented within the database by utilizing the sequences of real-time security events. A decision engine activates at least one countermeasure for the aircraft function to be protected, in response to the inferred location and progression of the attack.

Other objects, advantages, and novel features will become apparent from the following detailed description of the invention when considered in conjunction with the accompanying drawings.

DETAILED DESCRIPTION

Figure 1:
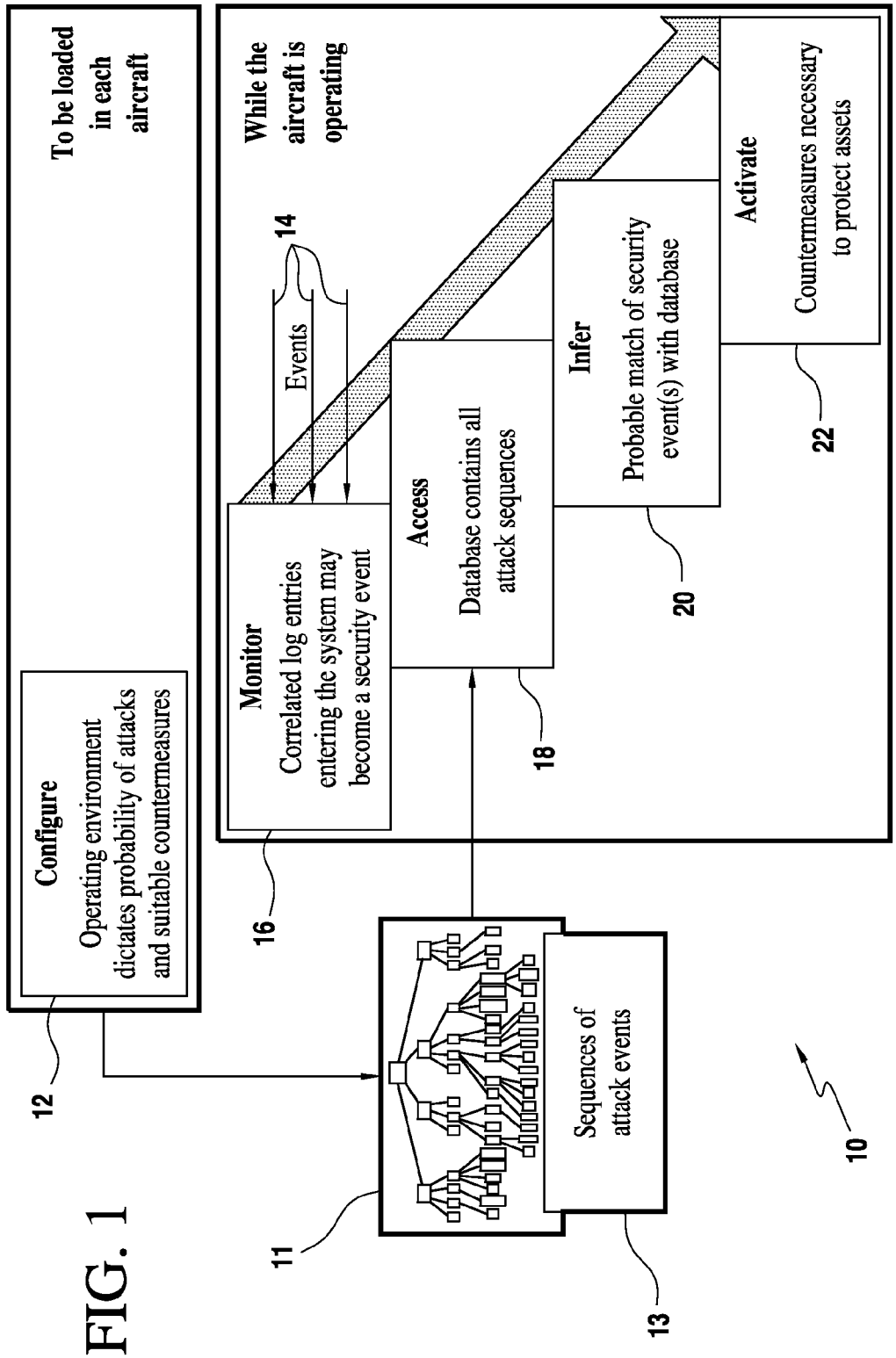
FIG. 1 is a block diagram illustrating an embodiment of a method for providing dynamic security hardening of selected aircraft functions in accordance with the present invention.

Referring now to the drawings and the characters of reference marked thereon, FIG. 1 illustrates a preferred embodiment of the method 10 for providing dynamic security hardening of selected aircraft functions of the present invention. A database 11 is configured, as shown by process block 12, to store sequences of attack events 13 indicative of an attack of at least one aircraft function. The database 11 is loaded in the aircraft.

While the aircraft is operating, the method 10 of the present invention is activated. Sequences of security events 14 are monitored in a real-time fashion for at least one aircraft function, as shown by process block 16. The database 11 containing the sequences of attack events 13 is accessed, as shown by process block 18. The location and progression of an attack is probabilistically inferred by a processor, utilizing the sequences of real-time security events, as shown by process block 20. Then, at least one countermeasure in response to an inferred location and progression of an attack is activated, as shown by process block 22.

Figure 2:
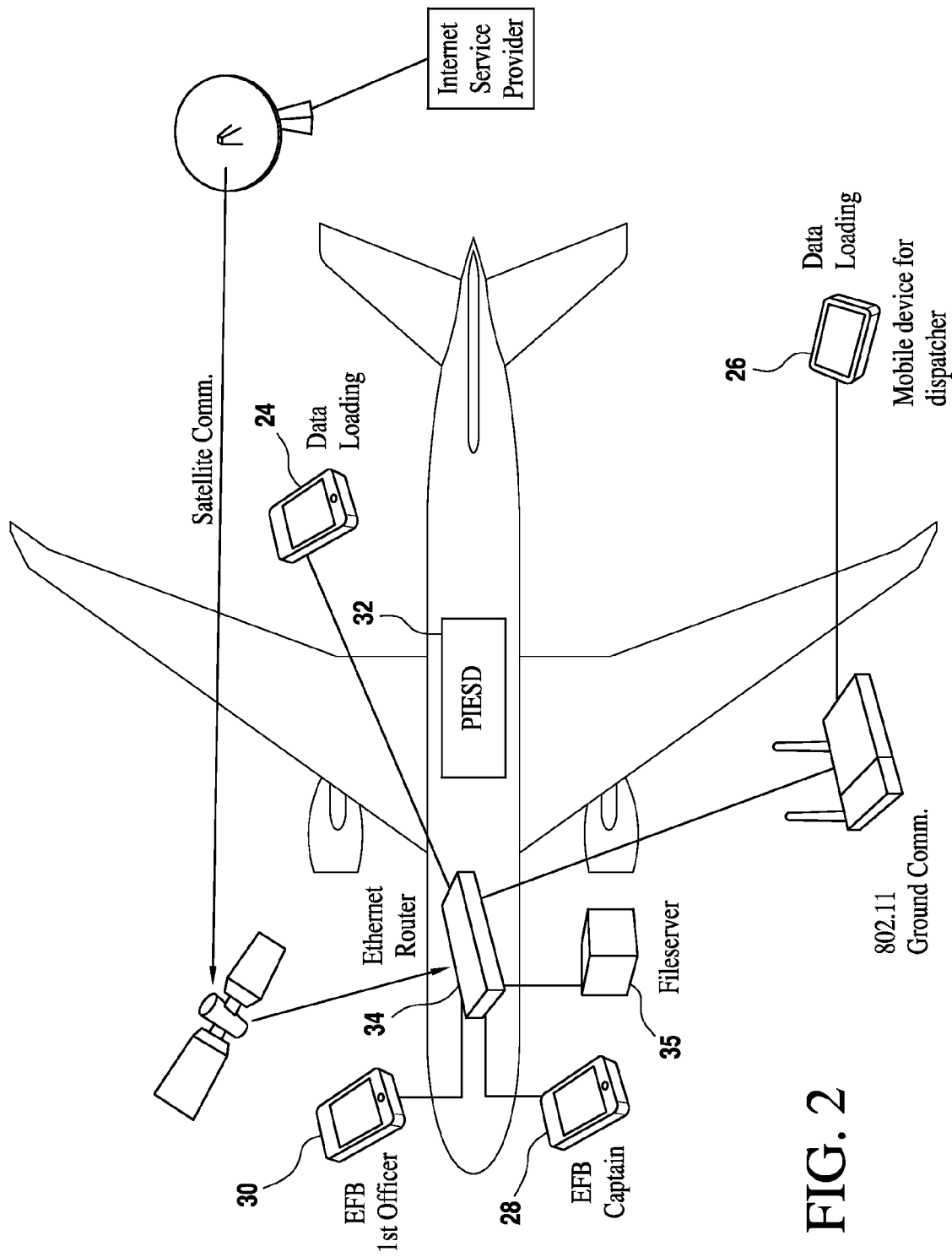
FIG. 2 is a schematic view of an aircraft highlighting aircraft functions and cyber threat access points according to some embodiments of the present invention.

Referring now to FIG. 2, it can be seen that the aircraft functions may include functions such as data loading 24, 26, electronic flight bags 28, 30, and passenger information and entertainment service domain 32. These functions may access an Ethernet router 34. The security issue at hand is that the Ethernet router cannot be compromised. Due to size, weight and power (SWAP) limitations on aircraft, some resources are shared between safety critical systems and functions, with other systems, which may have security vulnerabilities. For example, an Ethernet switch routes traffic originating from the Passenger Information and Entertainment Service Domain (PIESD), and also routes traffic to/from the safety critical Aircraft Control Domain (ACD). The security issue is that PIESD traffic cannot compromise safety critical functions. Another example is that loading new safety critical software on an aircraft wirelessly presents significant security issues, since the integrity of loaded software must be guaranteed.

Real-time security events are generated when an algorithm correlates log entries from one or more logs. Logs are essentially lists of activities that occurred. Records of new activities are appended to the end of the logs as they occur. An example of a log entry is a firewall which logs every attempt to log into a computer. If there is more than one firewall then log entries from each firewall can be correlated to generate a security event. This implies some form of data mining capability, i.e., a real-time security event is inferred from patterns that suggest more complicated circumstances. Thus, the step of monitoring the sequences of real-time security events may include analyzing collected logs to highlight behaviors of interest representing the security events, the logs being defined as lists of activities that occurred, with records of new events being appended to the end of the logs as they occur.

Figure 3:
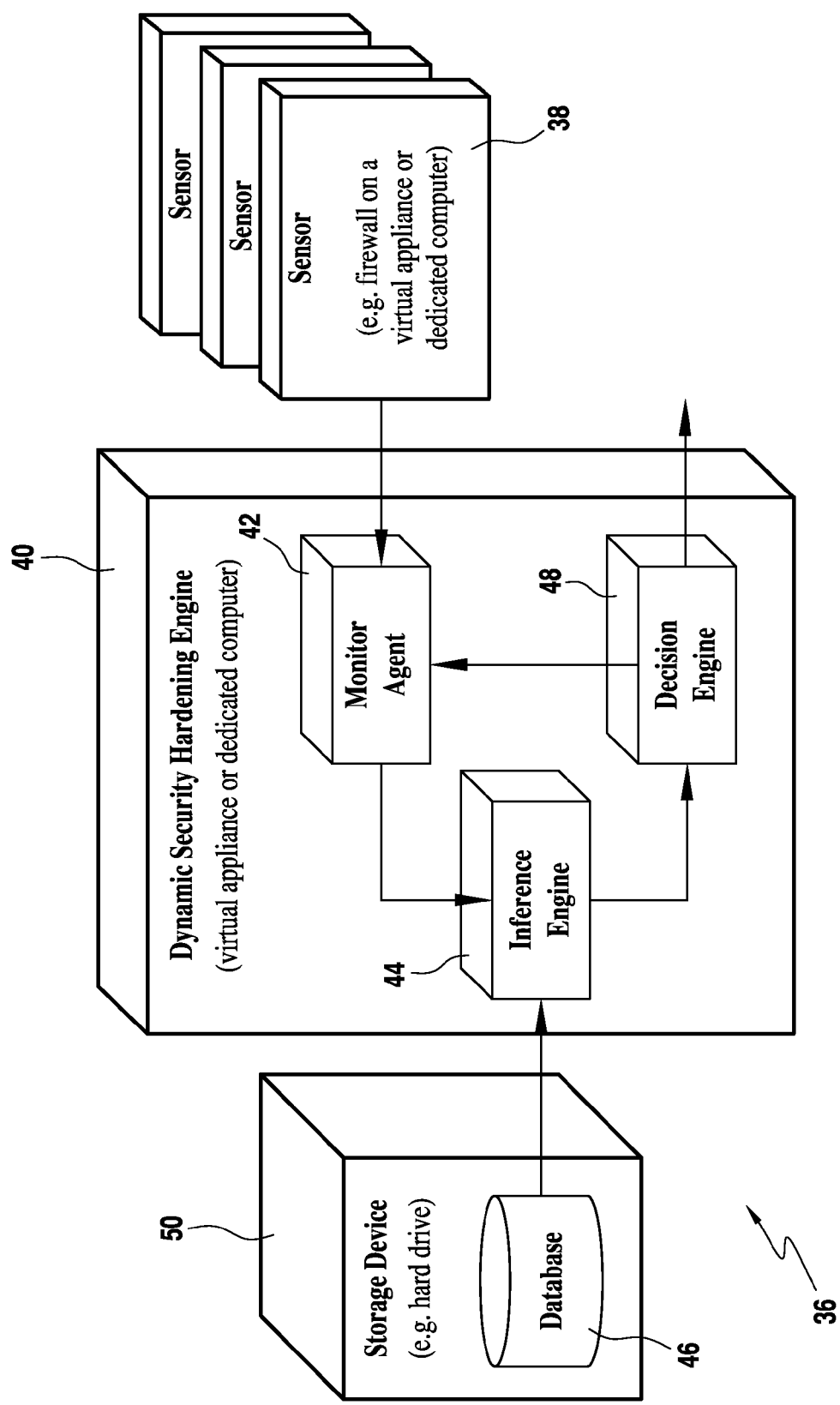
FIG. 3 is block diagram illustrating an embodiment of a system for providing dynamic security hardening of selected aircraft functions in accordance with the present invention.

Referring now to FIG. 3, a hardware block diagram illustrating an embodiment of a system 36 for providing dynamic security hardening of selected aircraft functions according to the present invention is illustrated. The system 36 includes a plurality of sensors 38 configured to collect and log data entering an aircraft. These sensors 38 may be, for example, firewalls on a virtual appliance (i.e., a software component residing in a computer) or dedicated computer, intrusion detection systems, or various access control mechanisms typically found on aircraft.

A dynamic security hardening engine 40 is operatively connected to the sensors 38. The dynamic security hardening engine 40 may be, for example, a virtual appliance or a dedicated computer. Engine 40 includes a monitor agent 42 for receiving the data collected by the plurality of sensors 38, analyzing the data, and generating sequences of real-time security events for at least one aircraft function. The monitor agent 42 identifies security events, generally called situations of interest (SOI). Typically, SOI are specified in the form of signatures (i.e., blacklist) as seen in antivirus software. A more modern approach is anomaly detection, which identifies significant differences from normal behavior. This implies the use of clustering techniques such as support vector machine. With anomaly detection, behaviors are dynamic. In an avionics context: 1) more traffic is expected when an aircraft is on the ground; and 2) during a data load operation, an intruder with valid, stolen credentials can be detected through anomalous behavior. With anomaly detection, more false positives are expected, but the ability to detect previously unknown SOIs is enhanced. Note that signature based systems cannot detect new SOIs. Agent(s) are continuous queries that perform tasks such as filtering, aggregating, and correlating data entering the system, or patterns searching. The monitor agent 42 is closely related to Complex Event Processing (CEP), i.e., event processing that combines data from multiple sources to infer events or patterns that suggest more complicated circumstances.

The dynamic security hardening engine 40 includes an inference engine 44 for: 1) accessing a database 46 storing a plurality of sequences of attack events indicative of an attack of the at least one aircraft function; and 2) probabilistically inferring, by at least one processor, the location and progression of an attack represented within the database by utilizing the sequences of real-time security events.

Database 46 contains attack trees. An attack tree forms the basis of the model of the system to protect. The preferred embodiment of the database is a graph database. It eases querying, and trees can be easily generalized to directed acyclic graphs. Each node in the tree represents a potential attack. The root node is the global goal of the attacker. Some nodes may have one or more associated countermeasures (node attributes). Thus each node has attributes. Node attributes may include: attack characteristics depending on the system's value, and its operational environment; and risk incurred. Nodes may have one or more countermeasures, each with attributes. A countermeasure requires the attacker to expend more resources to compromise the system. There is a cost to protect against attack (e.g. reduced capabilities, system reset). Attributes may include AND/OR (aggregator, choice, more fuzzy terms such as "some" and "most").

Each link has attributes. Link attributes may include a direction; an AND/OR aggregator; and/or, a transition probability.

An attack sequence is the set of links and nodes traversed by an attack that leads to violation(s) of some security property of the function or asset to protect. The database supports three primary functions: 1) Given one or more security event, infer the corresponding attack node. The very first query should return a list of leaf nodes, ordered by likelihood.

Subsequent queries should return a list of leaf nodes and parents, again, ordered by likelihood; 2) Given an attack sequence, infer the next attack. The query should return reachable nodes, ordered by likelihood. A node is reachable if it is connected via links to other nodes in the attack sequence; 3) Given many security events and results of previous queries, infer the progression of an attack. Early queries will not be as focused as later queries. The goal is to probabilistically verify whether the security property specified by the root node has been violated, given the sequence of 1) the received security events, and 2) the successfully taken countermeasures.

A common pitfall of established methods in practice is the demand for exact numbers. Wherever an attack (or security breach) is expressed as a basic event probability in attack trees, a reasonable quantitative analysis can only be realized if all the precise numbers are available. Further, attack trees are typically built on logical AND and OR gates. For example, one might build an attack tree where all events (logical AND) must occur in order to compromise a system function. There are cases where it is more general to state "some" events must occur in order to compromise a system function. The preferred embodiment of attack trees is through fuzzy measures introduced at the leaf nodes instead of crisp, precise probabilities; and at the logical AND and OR gates, to allow for less precise statements such as "most" and "some". In light of fuzzy attack trees, the preferred embodiment of an inference engine is a fuzzy inference engine. Fuzzy inference engines allow for broader and more flexible range of prior and likelihood probability density functions, typically found in other inference engines (e.g., Bayesian). In many cases, two simple rules, and a few words describe a complex, closed form probability density function. Fuzzy rules substantially extend the range of knowledge and statistical structure that prior or likelihood probability distribution functions (pdfs) can capture—and they do so in an expressive linguistic framework based on multivalued or fuzzy sets.

To probabilistically verify whether a security property (specified by the root node) is violated is a multicriteria decision making problem, Fuzzy set theory has been successfully used to handle imprecision (or uncertainty) in decision making problems. A multiple criteria decision making problem includes a collection of criteria of interest, and a set of alternatives (in our example, there are two alternatives, a security property is violated or not). Each criterion has an importance factor. In general there are interactions between criteria. Considering the following two criteria, secure system and computing resources; the relationship is that a highly secure system generally consumes more computing resources. To account for relationships between criteria, the preferred embodiment of criteria importance (i.e., utility function) is a fuzzy measure, where every possible subsets of the criteria collection is assigned a number u such that if subset A<=subset B, u(A)<=u(B). Once a measure is created, the Choquet integral, a summation technique, is used to evaluate the overall satisfaction of an alternative.

A decision engine 48 activates at least one countermeasure for the aircraft function to be protected, in response to an inferred location and progression of an attack. The decision engine 48 is responsible for the application of one or more countermeasure on one or more computer or virtual appliance or affecting the monitor agent given the inferred attack. A number of decision techniques have been developed over the past decades. These include decision trees, naïve Bayesian, neural network, support vector machine, k-nearest neighbors, and fuzzy logic model. In the Christodorescu, et al. '615 and '616 patents, a game-theoretic approach is used to identify the best decision given attack/response sequences. For aircraft applications, a fast, simple real-time decision is required. Since only a few countermeasures are expected, a simpler alternative such as decision tree is the preferred embodiment.

The database 46 resides in a storage device 50. The storage device 50 may be a file server or a hard disk or a combination of both.

Figure 4:
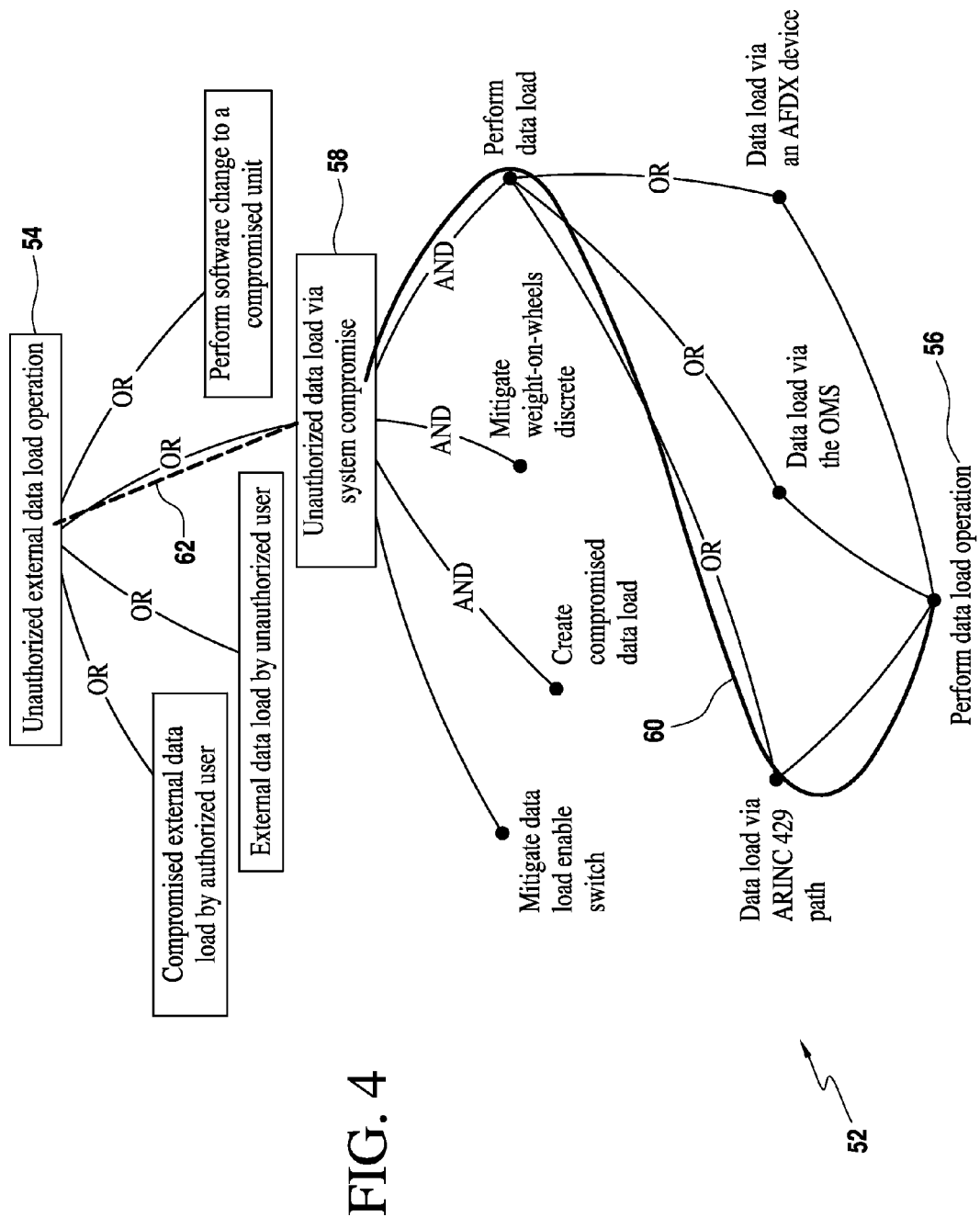
FIG. 4 is an example of an attack tree utilized for probabilistically inferring the location and progression of an attack in accordance with exemplary embodiments of the present invention.

Referring now to FIG. 4, an example of an attack tree for an unauthorized external data load operation is illustrated, designated generally as 52. The present invention detects a user performing a data load operation 56. Furthermore, the data load operation is performed via an ARINC 429 path (a standard aircraft network) 60. The present invention may deem this data load operation to be an unauthorized data load via system compromise 58, because of an exceedingly low probability (e.g., for this aircraft, data load operations via ARINC 429 are unauthorized), coupled with a number of additional compromises (labeled AND). Node 58 has a number of attributes associated with it, including one or more countermeasures to apply (e.g., disable the data load operation). At this point, the present invention concludes an unauthorized external data load operation 54 is taking place, since only one security event is needed (i.e., labeled OR 62). As noted by highlighted path 60, the operating environment will differ from aircraft to aircraft. For example; an airline's operational procedures may never or only sometimes, allow data load operations from an ARINC 429 path. In general, links between nodes will have different probabilities, and nodes may have different countermeasures.

In our example, a security event is generated from one or more logs as a result of a user accessing the function "perform a data load operation" 56. The first database query would be to find node 56 in the attack tree that corresponds to the security event. A second security event is generated since the function (perform a data load operation) is invoked from an ARINC 429 component. A second database query would find another node in the attack tree. Given two nodes, a query to predict the next node in the attack tree can be formulated. In our example, the query would return the node 58 labeled "Unauthorized data load via system compromise". An attack is emerging 60 from the previously identified nodes. A final query to identify which security property is violated (or is about to be violated) would result in identifying the node labeled "unauthorized external data load operation" 54.

Although FIG. 4 shows only a few nodes and links, it is understood that the attack tree for a typical aircraft security function would include hundreds of nodes and links.

Other embodiments and configurations may be devised without departing from the spirit of the invention and the scope of the appended claims.

The invention claimed is:

1. A method for providing dynamic security hardening of selected aircraft functions, comprising the steps of:
 a) monitoring sequences of real-time security events for at least one aircraft function;
 b) accessing a database storing a plurality of sequences of attack events indicative of an attack of the at least one aircraft function, wherein said database comprises:
   i) a plurality of nodes, each node representing a potential attack, each node including at least one node attribute;
   ii) a plurality of links, each link connecting a pair of said plurality of nodes, each link representing a potential attack progression, each link including at least one link attribute; and,
   iii) at least one security property for a specified node;
 c) probabilistically inferring, by at least one processor, a location, progression, and security property of a real-time attack represented within the database by utilizing said sequences of real-time security events; and d) automatically activating at least one avionics specific countermeasure in real-time, in response to the inferred location, progression, and security property of the real-time attack.

2. The method of claim 1, wherein said at least one aircraft function is selected from a group of aircraft functions including: data loading, electronic flight bags, and passenger information and entertainment service domain.

3. The method of claim 1, wherein said step of monitoring said sequences of real-time security events comprises analyzing collected logs to highlight behaviors of interest representing the security events, the logs being defined as lists of activities that occurred, with records of new events being appended to the end of the logs as they occur.

4. The method of claim 1, wherein said database comprises a plurality of attack trees, each attack tree comprising:
a) said plurality of nodes; and
b) said plurality of links.

5. The method of claim 4, wherein said step of probabilistically inferring comprises querying the database by the steps of:
a) inferring a current node(s) under attack in the appropriate attack tree for a real-time security event;
b) inferring a next node(s) under attack in the appropriate attack tree for a sequence of real-time security events; and
c) identifying whether a security property specified in a root node of said plurality of nodes is violated.

6. The method of claim 4, wherein said at least one node attribute comprises at least one countermeasure.

7. The method of claim 1, wherein said step of probabilistically inferring comprises multicriteria decision making utilizing fuzzy set theory.

8. The method of claim 1, wherein said step of activating at least one countermeasure comprises utilizing a decision tree.

9. A system for providing dynamic security hardening of selected aircraft functions, comprising:
a) a plurality of sensors configured to collect and log data entering an aircraft;
b) a dynamic security hardening engine, comprising:
i) a monitor agent for receiving said data collected by said plurality of sensors, analyzing the data, and generating sequences of real-time security events for at least one aircraft function;
ii) an inference engine for: 1) accessing a database storing a plurality of sequences of attack events indicative of an attack of the at least one aircraft function; and 2) probabilistically inferring, by at least one processor, a location, progression, and security property of a real-time attack represented within the database by utilizing said sequences of real-time security events; and
iii) a decision engine for automatically activating at least one avionics specific countermeasure in real-time, for the aircraft function to be protected, in response to the inferred location, progression, and security property of the real-time attack, wherein said database comprises:
i) a plurality of nodes, each node representing a potential attack, each node including at least one node attribute;
ii) a plurality of links, each link connecting a pair of said plurality of nodes, each link representing a potential attack progression, each link including at least one link attribute; and,
iii) at least one security property for a specified node.

10. The system of claim 9, further comprising a storage device including said database.

11. The system of claim 9, wherein said at least one aircraft function is selected from a group of aircraft functions including: data loading, electronic flight bags, and passenger information and entertainment service domain.

12. The system of claim 9, wherein said sequences of real-time security events comprises collected logs to highlight behaviors of interest representing the security events, the logs being defined as lists of activities that occurred, with records of new events being appended to the end of the logs as they occur.

13. The system of claim 9, wherein said database comprises a plurality of attack trees, each attack tree comprising:
a) said plurality of nodes; and
b) said plurality of links.

14. The system of claim 9, wherein said inference engine is configured to query the database by:
a) inferring a current node(s) under attack in the appropriate attack tree for a real-time security event;
b) inferring a next node(s) under attack in the appropriate attack tree for a sequence of real-time security events; and
c) identifying whether a security property specified in a root node of said plurality of nodes is violated.

15. The system of claim 9, wherein said at least one node attribute comprises at least one countermeasure.

16. The system of claim 9, wherein said inference engine is configured to provide said probabilistically inferring by multicriteria decision making utilizing fuzzy set theory.

17. The system of claim 9, wherein said decision engine is a decision tree configured to activate said at least one countermeasure.

18. A method for providing dynamic security hardening of selected aircraft functions, comprising the steps of:
a) monitoring sequences of real-time security events for at least one aircraft function;
b) accessing a database storing a plurality of sequences of attack events indicative of an attack of the at least one aircraft function, wherein said database comprises a graph database comprising:
i) a plurality of nodes, each node representing a potential attack, each node including at least one node attribute;
ii) a plurality of links, each link connecting a pair of said plurality of nodes, each link representing a potential attack progression, each link including at least one link attribute; and,
iii) at least one security property for a specified node;
c) probabilistically inferring, comprising multicriteria decision making utilizing fuzzy set theory, utilizing at least one processor, a location, progression, and security property of a real-time attack represented within the database by utilizing said sequences of real-time security events, wherein said step of activating at least one countermeasure comprises utilizing a decision tree; and
d) automatically activating at least one avionics specific countermeasure in real-time, in response to an inferred location, progression, and security property of the real-time attack.

* * * * *